United States Patent [19]

Halmi

[11] Patent Number: 4,671,109
[45] Date of Patent: Jun. 9, 1987

[54] FLOW MEASURING DEVICE FOR LIQUIDS BEARING ENTRAINED SOLIDS

[75] Inventor: Dezsoe Halmi, Cranston, R.I.

[73] Assignee: D. Halmi and Associates, Inc., Pawtucket, R.I.

[21] Appl. No.: 809,771

[22] Filed: Dec. 16, 1985

[51] Int. Cl.⁴ .......................... G01F 1/44; G01F 25/00
[52] U.S. Cl. .................................. 73/198; 73/861.63; 73/756; 73/3
[58] Field of Search ............... 73/198, 756, 3, 861.42, 73/861.47, 861.63, 861.64

[56] References Cited

U.S. PATENT DOCUMENTS

| | | | |
|---|---|---|---|
| 2,868,013 | 1/1959 | Terrell | 73/861.63 |
| 3,821,897 | 7/1974 | Frazel | 73/861.47 |
| 3,983,756 | 10/1976 | Danguillier et al. | 73/756 X |
| 4,096,754 | 6/1978 | Beveridge, Jr. et al. | 73/756 X |
| 4,435,980 | 3/1984 | Schmidt | 73/198 |
| 4,466,290 | 8/1984 | Frick | 73/861.47 |

Primary Examiner—Herbert Goldstein
Attorney, Agent, or Firm—Salter & Michaelson

[57] ABSTRACT

A flow measuring device comprises a flow tube having sequentially disposed inlet, converging and throat sections and first and second pressure sensing assemblies for sensing the pressures in the inlet and throat sections, respectively. Each of the pressure sensing assemblies includes a tubular housing portion which extends outwardly from the flow tube and communicates with the interior of the adjacent section thereof, a cylindrical diaphragm-type pressure sensing element which is slidably received in the housing portion, and a gate valve having a gate which is receivable in the housing portion thereof when the sensing element therein is in an outwardly disposed position in the housing portion. Each of the housing portions has a manometer tap formed therein which is disposed outwardly at the gate valve therein. Accordingly, each of the pressure sensing elements can be calibrated by moving it outwardly in its housing portion, closing the adjacent gate valve, connecting a manometer to the tap in the housing portion thereof and then opening the gate valve so that the manometer provides an indication of the pressure in the adjacent section of the flow tube.

5 Claims, 5 Drawing Figures

FLOW MEASURING DEVICE FOR LIQUIDS BEARING ENTRAINED SOLIDS

BACKGROUND AND SUMMARY OF THE INVENTION

The instant invention relates to flow measuring devices and more particularly to a differential-pressure-type flow measuring device which is adapted for measuring the flow rates of fluids carrying entrained solids therein.

A wide variety of differential-pressure-type flow measuring devices have been heretofore-available for use in various different flow measurement applications. In this connection, most of the heretofore-available differential-pressure-type flow measuring devices have generally comprised flow tubes having sequentially disposed inlet, converging and throat sections, and they have had pressure sensing taps in the inlet and throat sections thereof for sensing the pressures therein. Flow measuring devices of this general type have been operative for providing indications of the flow rates of fluids passing through the flow tubes thereof by applying the differential pressures which are sensed between the inlet and throat sections thereof in well-known flow equations which are calibrated for specific applications. In any event, differential-pressure-type flow measuring devices of this general type have been constructed in various diferent dimensions and proportions in order to adapt them for meeting the needs of various specific applications. Specific exmples of devices of this type are found in the applicant's U.S. Pat. Nos. 4,516,434 and 4,528,847.

It has been found that while differential-pressure-type flow measuring devices of the above-described type can be effectively used for measuring the flow rates of most fluids, they often cannot be effectively utilized for measuring the flow rates of fluids having significant quantities of entrained solids therein. This is because most of the heretofore-available differential-pressure-type flow measuring devices have been constructed with open pressure sensing taps for sensing the pressures in the inlet and throat sections thereof, and when they have been used for measuring the flow rates of fluids carrying entrained solids therein, the open pressure sensing taps thereof have tended to become rapidly clogged by the solids. In order to overcome this problem, differential-pressure-type flow measuring devices having closed diaphragm-type pressure sensors have been developed for measuring the flow rates of fluids having entrained solids therein. However, while it has been found that flow measuring devices of this type are substantially less susceptible to becoming clogged than conventional differential-pressure-type flow measuring devices, even the heretofore-available devices having diaphragm-type pressure sensors have had significant disadvantages. Specifically, it has been found that when a diaphragm-type flow measuring device malfunctions, it is generally necessary to remove it from service, because it is generally not possible to repair, replace, or unclog the diaphragm-type sensors of a device of this type while the devices is in service. It is also generally necessary to recalibrate a device of this type at an off-site location after it has been repaired.

The instant invention provides an effective flow measuring device which overcomes many of the problems and disadvantages of the heretofore-available devices for measuring the flow rates of fluids bearing entrained solids. Specifically, the flow measuring device of the instant invention comprises a flow tube having sequentially disposd inlet, converging, and throat sections, wherein the inlet and throat sections each have substantially uniform diameters, and first and second pressure sensing means which communicate with the inlet and throat sections, respectively, for sensing the pressures therein. However, at least one of the pressure sensing means of the device comprises a tubular housing portion which is mounted in the flow tube so that it extends outwardly therefrom and so that the interior of the housing portion communicates with the interior of the flow tube, and a pressure sensing diaphragm element which is received in the housing portion so that it communicates with the interior of the flow tube for sensing the pressure in the adjacent section thereof. The housing portion and the diphragm element of the device are constructed so that the diaphragm element is slidable in sealed relation in the housing portion between a first position wherein it is disposed adjacent the flow tube and a second position wherein it is spaced outwardly therefrom, and the device further comprises means which is receivable in the housing portion when the diaphragm element is in the second position thereof for providing a sealed obstruction between the diaphragm element and the interior of the flow tube. Preferably, the first and second pressure sensing means each comprise a tubular housing portion, a diaphragm element, and means for providing a sealed obstruction in the housing portion thereof, and preferably the sealed obstruction means of each of the housing portions comprises a gate valve having a gate which is receivable between the adjacent diaphragm element and the interior of the flow tube when the adjacent diaphragm element is in the second position thereof. Further, preferably each of the housing portions has a manometer tap formed therein which is positioned so that when the adjacent diaphragm element is in the second position thereof and the obstruction means of the housing portion is in a withdrawn nonobstructing position, the manometer tap communicates with the adjacent section of the interior of the flow tube through the housing portion. Accordingly, when a manometer is connected to the manometer tap, it can be utilized for providing an indication of the true pressure in the adjacent section of the flow tube in order to properly calibrate the adjacent diaphragm element. Preferably, the diaphragm elements of the flow measuring device are of cylindrical configuration, and the housing portions preferably have O-rings therein which allow the diaphragm elements to be slidably repositioned in sealed relation in their respective housing portions. Further, the diaphragm elements are preferably dimensioned so that they have diameters which are less than approximately one-fourth of the diameter of the throat section of the flow tube.

During use and operation of the device of the instant invention under normal operating conditions, the diaphragm elements provide effective indications of the pressures in the inlet and throat sections of the flow tube, and these pressures can be applied in a flow equation to provide an indication of the flow rate of a fluid passing through the flow tube. In the event that one of the diaphragm elements malfunctions, it can be moved outwardly in its respective housing portion, the adjacent gate valve on the housing portion can be closed, and the diaphragm element can then be checked or replaced. Further, when the same or a new diaphragm element is inserted in the housing portion and positioned therein so that it is in its outwardly disposed position, the adjacent manometer tap can be connected to a manometer and the gate valve on the housing portion opened in order to calibrate the diaphragm element without allowing fluid to leak out of the device. In this connection, since the manometer tap in the housing portion is normally only used for short periods of time, it is not likely to become clogged; although even if it should become clogged, it can easily be unclogged by closing the adjacent gate valve and inserting a probe into the manometer tap. As a result, the device of the instant invention can be effectively calibrated without removing it from a flow system, and in most cases the flow system does not need to be shut down to repair the device.

Accordingly, it is a primary object of the instant invention to provide an effective device in measuring the flow rate of a fluid bearing entrained solids.

Another object of the instant invention is to provide an effective device for measuring the flow rate of a fluid bearing entrained solids which can be calibrated without removing it from a flow system.

A still further object of the instant invention is to provide a device for measuring the flow rate of a fluid bearing entrained solids wherein the device comprises a diaphragm element which is removable while a fluid is passing through the device.

Other objects, features and advantages of the invention shall become apparent as the description thereof proceeds when considered in connection with accompanying illustrative drawings.

DESCRIPTION OF THE DRAWINGS

In the drawings which illustrate the best mode presently contemplated for carrying out the present invention.

DESCRIPTION OF THE INVENTION

Figure 1:
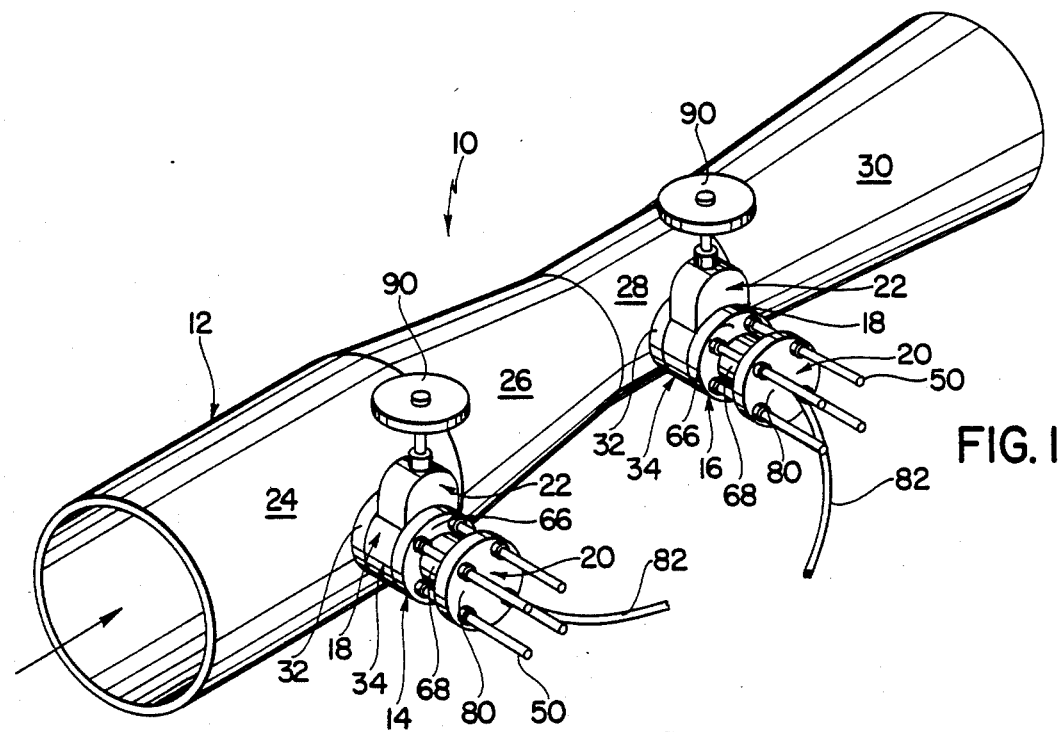
FIG. 1 is a perspective view of the device of the instant invention.
Figure 2:
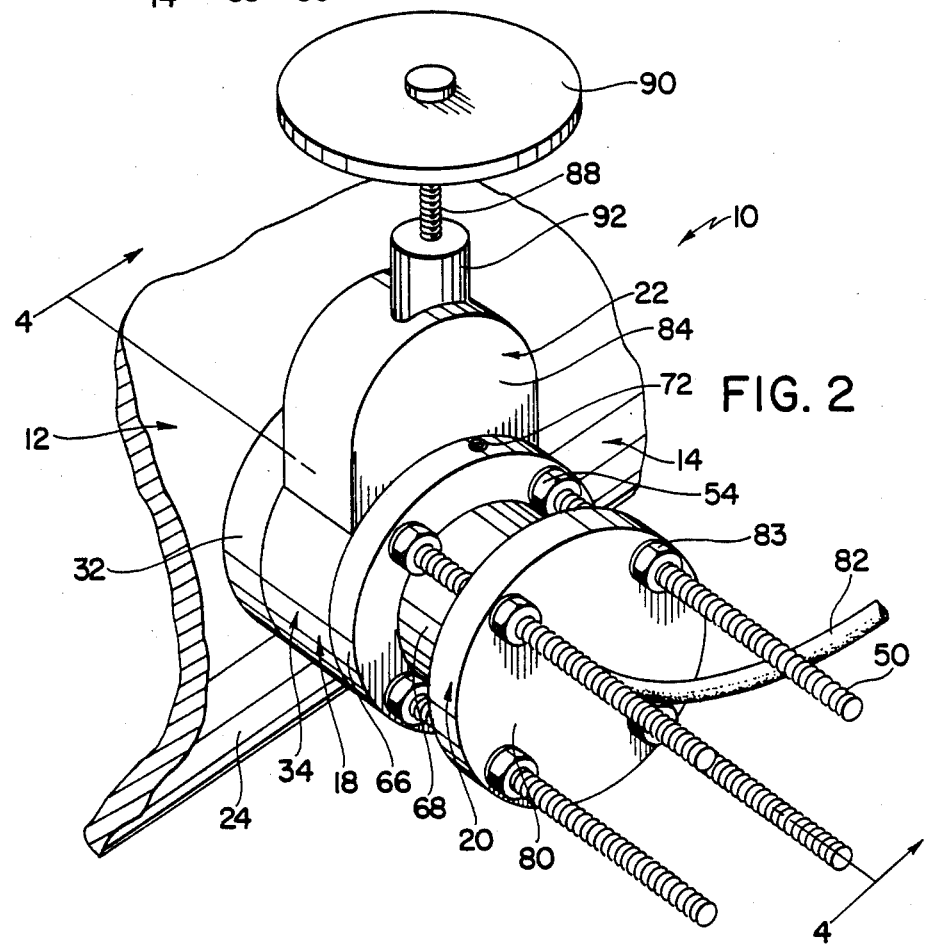
FIG. 2 is an enlarged fragmentary perspective view thereof.
Figure 3:
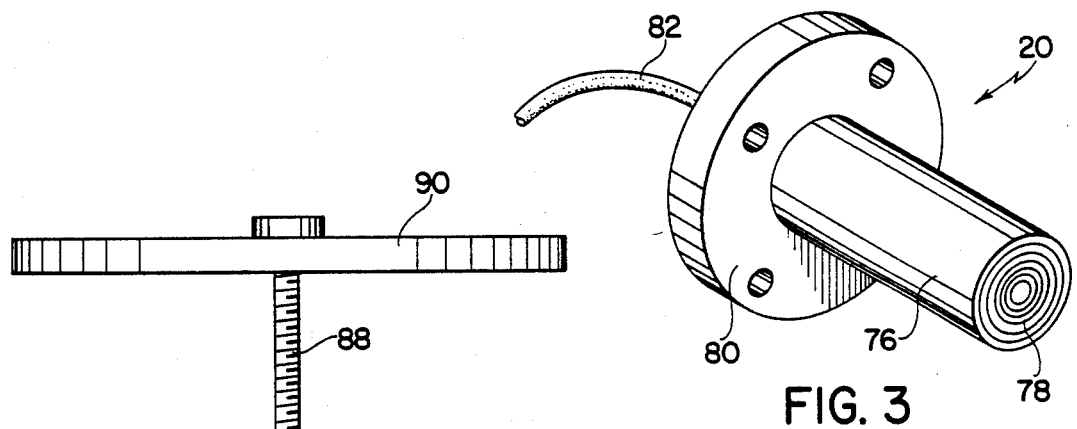
FIG. 3 is a perspective view of one of the diaphragm elements of the device.

Referring now to the drawings, the flow measuring device of the instant invention is illustrated in FIG. 1 and generally indicated at 10. The device 10 comprises a flow tube generally indicated at 12, and first and second pressure sensing assemblies generally indicated at 14 and 16, respectively, which are mounted on the flow tube 12 for sensing pressures in the interior thereof as a fluid is passed therethrough. In this connection, the first and second pressure sensing assemblies 14 and 16, respectively, each comprise a tubular housing portion generally indicated at 18, a diaphragm-type pressure sensing element indicated at 20, and a gate valve assembly generally indicated at 22. The pressure sensing assemblies 14 and 16 are assembled with the flow tube 12 so that the housing portions 18 extend outwardly from the flow tube 12 and the pressure sensing elements 20 of the assemblies 14 and 16 are received in their rspective housing portions 18 so that they communicate with the interior of the flow tube 12. The pressure sensing elements 20 are, however, mounted in their respective housing portions 18 so that they are individually slidable between inwardly disposed first positions thereof wherein the inner extremities of the diaphragm elements 18 are located adjacent the inner circumference of the flow tube 12 and outwardly disposed second positions thereof wherein the inner extremities of the diaphragm elements 18 are spaced outwardly from the flow tube 12 to allow the gate valve assemblies 22 to be individually manipulated to closed positions wherein they provide sealed obstructions in their respective housing portions 18 between the interior of the flow tube 12 and the sensing elements 20.

The flow tube 12 is preferably formed as an Venturi-type flow tube, and it comprises sequentially disposed inlet, converging, and throat sections 24, 26 and 28, respectively; and it preferably further comprises a downstream diverging section 30 which extends from the throat section 28. The inlet section 24 is preferably formed in a substantially straight-walled tubular configuration, and the converging section 26 extends from the inlet section 24, and it has a gradually decreasing sectional dimension. The throat section 28 preferably extends from the converging section 26, it is preferably formed in a substantially straight-walled tubular configuration, and it has a sectional dimension which is significantly less than the sectional dimension of the inlet section 24. The downstream diverging section 30 preferably extends from the throat section 28, and it has a gradually increasing sectional dimension. Accordingly, because of the configuration of the flow tube 12, it is possible to determine the flow rate of a fluid passing therethrough by sensing the pressures in the inlet and throat sections 24 and 28, respectively, and applying these pressures in well-known flow equations.

The flow sensing asemblies 14 and 16 are mounted on the walls of the flow tube 12 so that they communicate with the interior of the inlet and throat sections 24 and 28, respectively, for sensing the pressures therein as a fluid is passed through the flow tube 12.

The housing portions 18 of the flow sensing assemblies 14 and 16 each comprise a boss 32 which is integrally formed on the adjacent section of the flow tube 12, a valve body portion generally indicated at 34, and an outer extension portion generally indicated at 36. An aperture 38 extends through each of the bosses 32 and the respective adjacent sections of the flow tube 12, an aperture 40 extends through each of the valve body portions 34, and an aperture 42 extends through each of the extension portions 36, the apertures 38, 40 and 42 cooperating to define generally straight-walled tubular interior configurations in their respective body portions 34. A plurality of threaded apertures 44 are formed in the each of bosses 32, and correspondingly positioned apertures 46 and 48 are provided in each of the valve body portions 34 and each of the extension portions 36, respectively. Threaded rods 50 extend through the apertures 48 and 46 and are received in the threaded apertures 44, and gaskets 52 are assembled with each of the bosses 32, the valve body portions 34 and the extension portions 36 on opposite sides of the valve body portions 34. Threaded nuts 54 and washers 56 are received on the threaded rods 50 for securing the valve body portions 34 and the extension portions 36 on the bosses 32 so that the adjacent apertures 38, 40 and 42 are in substantially aligned relation whereby they cooperate to define tubular interior configurations in their respective housing portions 18 for receiving the pressure sensing elements 20. The valve body portions 34 are actually part of the gate valves 22, and they are formed with slots 58 therein which are adapted to receive the gates of the gate valves 20 as will hereinafter be more fully set forth. Also formed in the valve body portions 34 are annular slots 60 which are aligned with the slots 58, and grooves containing O-rings 62 are provided on the outer sides of the slots 60. Beveled edges 64 are formed along the inner portions of the slots 60. Accordingly, the valve body portions 34 define the central portions of their respective tubular housing portions 18, and the slots 58 and the annular slots 60 are provided for receiving and positioning the gates of the valves 22 in the housing portions 18 in a manner which will hereinafter be more fully set forth. The extension portions 36 each comprise a circular flange 66 which is adapted to be received in assembled relation with the adjacent valve body portion 34 and a tubular pipe section 68 which extends outwardly from its respective flange 66. A pair of manometer taps 70 having removable threaded plugs 72 therein are formed in each of the flanges 66, and inner grooves containing O-rings 74 are formed in the pipe sections 68 adjacent the outer terminal ends thereof.

Figure 4:
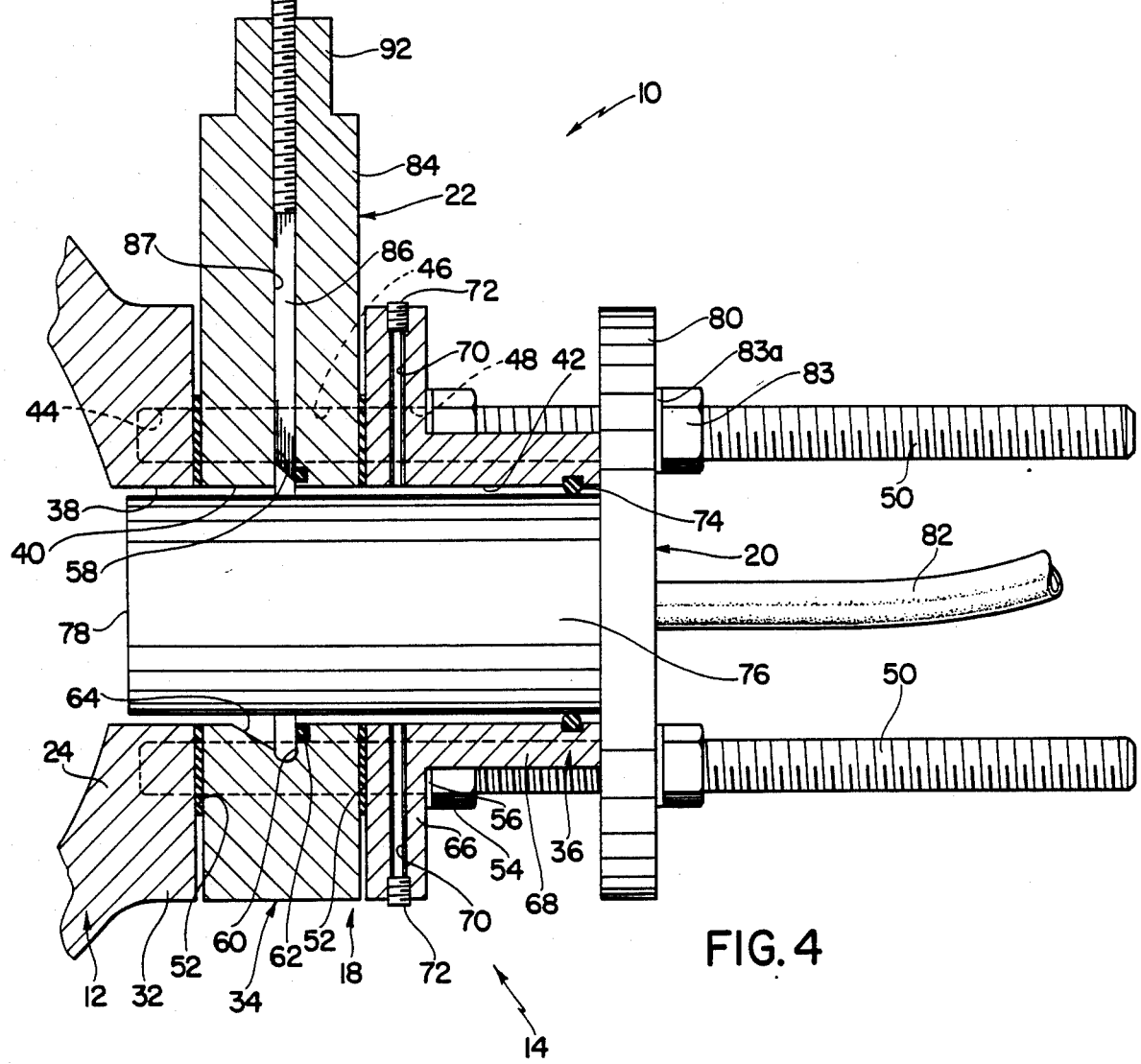
FIG. 4 is a further enlarged sectional view taken along line 4—4 in FIG. 2.
Figure 5:
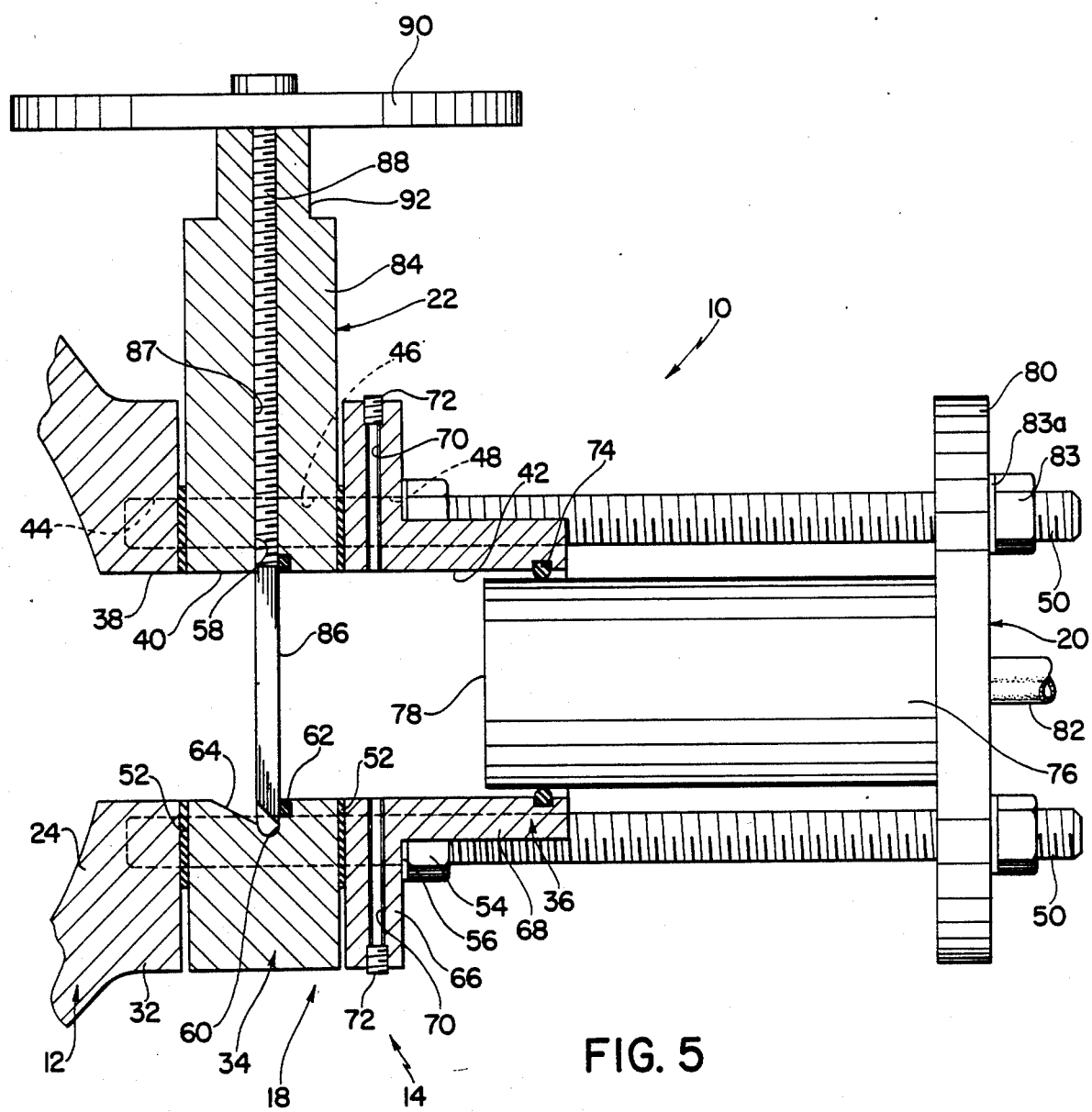
FIG. 5 is a similar sectional view with the diaphragm element in its partially withdrawn second position.

The pressure sensing elements 20 are preferably of conventional construction, and they each comprise a cylindrical main portion 76 having a diaphragm 78 formed at one end thereof, a flange 80 which extends outwardly from the opposite end thereof, and a transmission tube 82. The cylindrical main portion 76 and the diaphragm 78 of each of the sensing elements 20 are preferably made of a suitable metal, although the diaphragms 78 are constructed so that they are at least slightly flexible to apply pressures on fluids contained within their respective cylindrical main portions 76 so that the pressures can be transmitted through their respective transmission tubes 82 to remote sensors of conventional construction. The cylindrical main portions 76 are dimensioned to be received in their respective housing portions 18 so that the diaphragms 78 thereof are disposed adjacent the inner circumferences of their respective adjacent sections of the flow tube 12 and so that the O-rings 74 of their respective housing portions 18 snugly engage the outer circumference of the main portions 76 to provide a sealed relations between the cylindrical main portions 76 and the housing portions 18. Accordingly, the sensing elements are alternatively positionable in the inwardly disposed first positions thereof illustrated in FIG. 4 or the outwardly disposed second positions thereof illustrated in FIG. 5. Nuts 83 and washers 83a are threadedly received on the rods 55 for securing the sensors 20 in the first positions thereof as illustrated.

The gate valves 22 each comprise a gate valve housing 84 which is integrally formed with the respective gate valve body 34 thereof, a gate 86 which is received in a slot 87 so that it is positioned in substantially perpendicular relation to the longitudinal extent of the respective housing 84 thereof, and a stem 88 to which a handle 90 is attached. A threaded hub 92 extends integrally upwardly from each of the gate valve housings 84, and each of the threaded stems 88 is received in threaded engagement in the respective hub 92 thereof, so that when it is rotated by means of its respective handle 90, it moves inwardly or outwardly from the respective gate valve housing 84 thereof, depending on the direction of rotation. The gate 86 of each of the gate valves 22 is attached to the inner terminal end of its respective stem 88 in a manner which allows the stem 88 to be rotated with respect thereto; and accordingly, when one of the stems 88 is rotated to move it inwardly or outwardly from its respective housing 84, the gate 86 to which it is attached is moved inwardly or outwardly in its respective slot 87. Each of the slots 87 is aligned with the adjacent slot 58 in its respective gate valve body portion 34; and hence after one of the gates 86 has been moved past its respective slot 87, it travels in the adjacent slot 58 so that it is positionable in its respective housing portion 18 in a disposition wherein it provides an obstruction to the tubular interior thereof. Specifically, each of the gates 86 is positionable so that it obstructs the aperture 40 in its respective gate valve body portion 34 and so that the adjacent O-ring 62 sealingly engages it to prevent fluids from passing outwardly beyond the gate 86. It will be understood, however, that the gate 86 can only be received in the aperture 40 when the adjacent pressure sensing element 20 is in the outwardly disposed second position thereof or at least when it is disposed outwardly of the slot 58.

For use and operation of the flow measuring device 10, it is mounted in a flow system so that an appropriate fluid passes through the flow tube 12. The transmission tubes 82 are connected to appropriate pressure sensing devices for determining the differential pressures between the inlet and throat sections 24 and 28, respectively, of the flow tube 12 so that these differential pressures can be utilized in a flow equation for determining the fluid flow rate through the flow tube 12. In order to calibrate the device 10 to assure that accurate determinations of fluid flow rates are achieved, the nuts 83 are loosened and the pressure sensing elements 20 are moved outwardly on the threaded rods 50 until the diaphragms 78 are disposed outwardly from their adjacent manometer taps 70. The gate valves 22 are then moved to closed positions thereof wherein the gates 86 thereof obstruct the interiors of the housing portions 18, a plug 72 is removed from one of the manometer tubes 70 in each of the housing portions 18, and a manometer is connected to each of the open tubes 70. The gate valves 22 are then opened so that the manometers can provide accurate indications of the pressures in the adjacent sections of the flow tube 12. These pressures can then be utilized to calibrate the pressure sensing elements 20 so that they provide more accurate pressure readings. Thereafter the gate valves 22 are again closed, the manometers disconnected from their manometer tubes 70, and the appropriate plugs 72 are reinstalled in the tubes 70. The gate valves 22 are then opened, and the pressure sensing elements 20 are repositioned in their inwardly disposed first positions wherein the diaphragms 78 are located adjacent the inner circumferences of the adjacent sections of the flow tube 12, and the nuts 83 are again tightened. Accordingly, it is possible to provide on-site calibrations of the pressure sensing elements 20 of the device 10 without shutting down a flow system in which the device 10 is installed. In addition, it is possible to remove or replace one or both of the pressure sensing elements 20 without shutting down the flow system. Further, if a new sensing element 20 is installed in the device 10, it can be calibrated in the manner hereinabove described, and the device 10 does not need to be removed from a flow system in which it is installed during this procedure.

It is seen, therefore, that the instant invention provides an effective device for measuring the flow rates of fluids bearing entrained solids. The device 10 can be calibrated on site in the manner hereinabove set forth, and one or both of the pressure sensing elements 20 can be replaced or repaired without removing the device 10 from a flow system in which it is installed and without shutting down the flow system. Hence it is seen that the instant invention represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A flow measuring device comprising a flow tube having sequentially disposed inlet, converging and throat sections, wherein said inlet and throat sections each have substantially uniform diameters, and first and second pressure sensing means communicating with said inlet and throat sections, respectively, for sensing the pressures therein, at least one of said first and second pressure sensing means comprising a tubular housing portion which is mounted on said flow tube so that it communicates with the interior thereof, a pressure sensing diaphragm element received in said housing portion so that it communicates with the interior of said flow tube for sensing the pressure in the adjacent section thereof, said housing portion and said diaphragm element being constructed so that said diphragm element is slidable in sealed relation in said housing portion between a first position wherein it is disposed adjacent said flow tube and a second position wherein it is spaced outwardly therefrom, and means receivable in said housing portion when said diaphragm element is in the second position thereof for providing a sealed obstruction between said diaphragm element and said flow tube, said housing having a pressure tap therein, said pressure tap being positioned between said obstruction means and said diaphragm element when said diaphragm element is in the second position thereof so that when said obstruction means is withdrawn from said housing portion said pressure tap communicates with the interior of said flow tube through said housing portion.

2. In the flow measuring device of claim 1, said first and second pressure sensing means each comprising a tubular housing portion, a diaphragm element and sealed obstruction means.

3. In the flow measuring device of claim 1, said obstruction means comprising a gate valve having a gate which is receivable between said diaphragm element and said flow tube when said diaphragm element is in the second position thereof.

4. In the flow measuring device of claim 1, said diaphragm element being of cylindrical configuration.

5. In the flow measuring device of claim 4, said housing portion having an O-ring therein, said diaphragm element being slidably received in sealed relation in said O-ring.

* * * * *